United States Patent [19]

Holdeman John W.

[11] 4,189,960
[45] Feb. 26, 1980

[54] UNDERDRIVE TRANSMISSION WITH SUN GEAR AND CARRIER SLIDABLE AS A SUBASSEMBLY

[75] Inventor: Holdeman John W., Muncie, Ind.

[73] Assignee: Borg-Warner Corporation, Chicago, Ill.

[21] Appl. No.: 851,648

[22] Filed: Nov. 15, 1977

[51] Int. Cl.² .................. F16H 57/10; F16H 3/44
[52] U.S. Cl. .............................. 74/781 R; 74/750 R
[58] Field of Search ............ 74/781 R, 750 R, 781 B, 74/750 B; 192/6 A

[56] References Cited

U.S. PATENT DOCUMENTS

| | | | |
|---|---|---|---|
| 1,413,943 | 4/1922 | Snyder | 74/785 |
| 2,044,660 | 6/1936 | Alden | 74/781 R |
| 2,510,469 | 6/1950 | Greenlee | 74/781 R |
| 2,592,910 | 4/1952 | Keller | 74/750 R |
| 2,601,151 | 6/1952 | Keller | 74/750 R |
| 3,107,763 | 10/1963 | Hill | 192/41 R |
| 3,477,314 | 11/1969 | Rutkowski | 74/750 R |
| 3,682,020 | 8/1972 | Scheiter | 74/781 R |
| 3,872,742 | 3/1975 | States | 74/785 R |
| 4,069,725 | 1/1978 | Segawa | 74/750 B |
| 4,103,753 | 8/1978 | Holdeman | 74/750 R |

*Primary Examiner*—Benjamin Wyche
*Assistant Examiner*—David C. Reichard
*Attorney, Agent, or Firm*—Julian Schachner

[57] ABSTRACT

An underdrive transmission incorporates a planetary gear assembly including a sub-assembly which may be shifted manually between high and low-range modes to establish direct and reduction ratio drive. In the high-range mode, the drive path is from an input member directly through the carrier to an output member, with the gears unloaded. In the low-range mode, the sun gear is grounded to the housing through a reaction plate, and the drive path is from the input member to the ring gear and from the carrier to the output member. The sub-assembly includes a slidable shift sleeve on which are supported the sun gear, carrier and planet gears.

4 Claims, 4 Drawing Figures

UNDERDRIVE TRANSMISSION WITH SUN GEAR AND CARRIER SLIDABLE AS A SUBASSEMBLY

BACKGROUND OF THE INVENTION

The current trend in automotive passenger vehicle design is toward lower power-to-weight ratios and reduced axle ratios. The objective of such vehicle design is to achieve greater fuel economy and reduced emissions by reducing the number of engine revolutions per mile. To achieve this objective, vehicle performance may be reduced to such an extent that towing ability could become unacceptable.

The occasional need for greater towing ability can be met by an auxiliary underdrive transmission of moderate ratio. Such an underdrive transmission should be shiftable manually, either to direct drive or reduction ratio drive, with the vehicle stationary. The underdrive transmission should be capable of running continuously in either direct or ratio. It should be simple, inexpensive, and capable of being mounted at the output of a conventional automotive transmission.

SUMMARY OF THE INVENTION

This invention is directed in brief to an underdrive transmission capable of meeting the needs noted above. The underdrive transmission includes a planetary gear assembly incorporating a manually shiftable sub-assembly. The sub-assembly may be shifted to establish a high-range mode wherein direct drive is established from the input to the output. The sub-assembly may be shifted to establish a low-range mode wherein the sun gear acts as a reaction member, the ring gear acts as an input member, and the carrier acts as an output member to provide reduction ratio drive.

The sub-assembly includes a slidable shift sleeve. The carrier is fixed to the sleeve and the sun gear is journalled thereon. By sliding the sleeve, the sub-assembly may be shifted between high and low-range modes.

In the high-range mode, direct drive is established with the carrier engaging the input member. Power is transmitted from the input member through the carrier and sleeve to the output member. This is accomplished without loading the gears. In the low-range mode, reduction ratio drive is established with the sun gear grounded. Power is transmitted from the input member to the ring gear and from the carrier through the sleeve to the output member.

BRIEF DESCRIPTION OF THE DRAWINGS

The objects and advantages of this invention will become apparent to those skilled in the art upon careful consideration of the specification herein, including the drawings, wherein.

Figure 1:
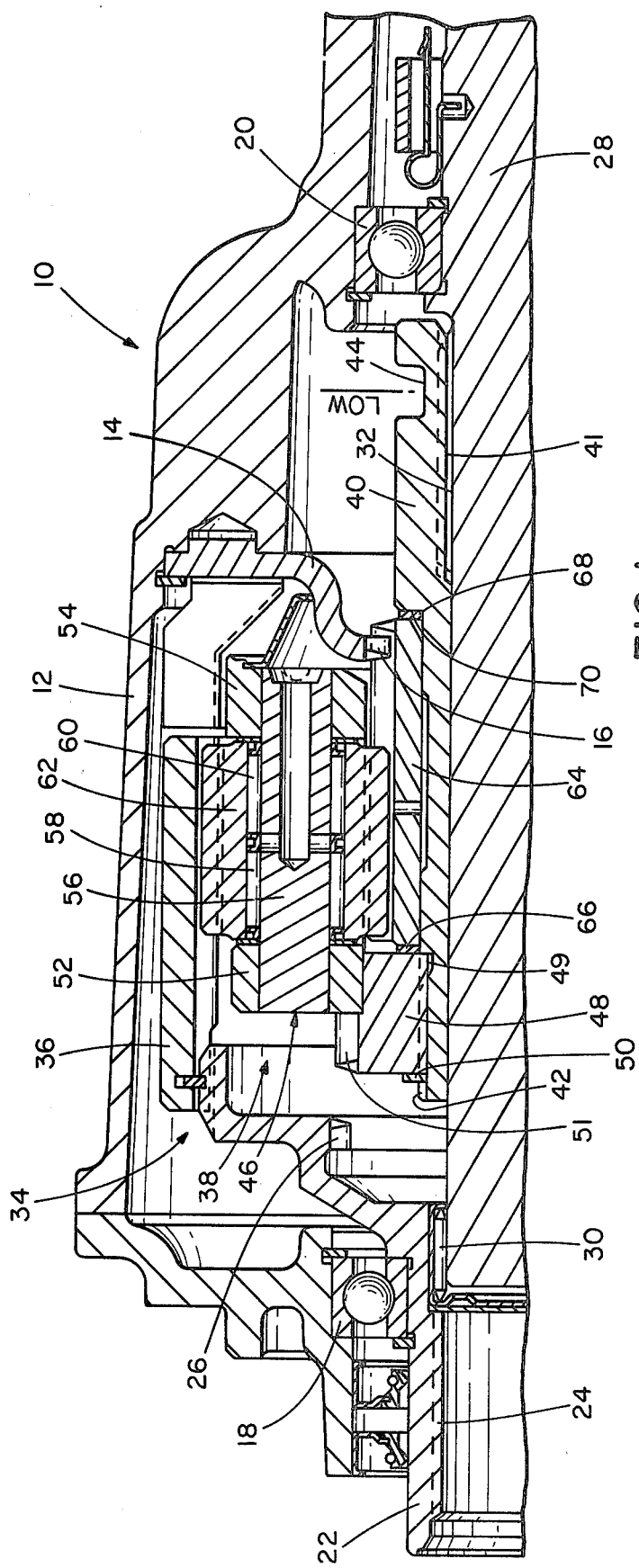
FIG. 1 is a sectional view showing details of the underdrive transmission in the low-range mode establishing reduction ratio drive.

While this invention is susceptible of embodiment in many different forms, there is shown in the drawings and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawings in greater detail, there is shown generally an underdrive transmission 10 which may be an auxiliary transmission for use with the conventional transmission of an associated automotive passenger vehicle. Underdrive transmission 10 includes a housing 12 to which is rigidly secured a reaction plate 14. Thus, reaction plate 14 forms an integral part of housing 12. Reaction plate 14 defines teeth 16. In the preferred from of the invention as shown herein, housing 12 supports an input ball bearing 18 and an output ball bearing 20.

A rotatable input member 22 is journalled in bearing 18 and extends into housing 12. Input member 22 defines splines 24 adapted for engagement with the output shaft of an associated conventional automotive transmission. Input member 22 also defines teeth 26. A rotatable output member or shaft 28 is journalled in bearing 20 and a suitable bearing 30. Output shaft 28 defines splines 32.

A planetary gear assembly 34 is mounted within housing 12. Assembly 34 includes a ring gear 36 secured to input member 22 for rotation therewith. Assembly 34 also includes a manually shiftable sub-assembly 38.

Sub-assembly 38 includes a shift sleeve 40 on output shaft 28. Sleeve 40 defines splines 41 and 42. Splines 41 are engaged with splines 32 of output shaft 28 such that sleeve 40 is rotatable with and slidable relative to output shaft 28. Sleeve 40 also defines a groove 44 adapted for engagement by a conventional shift fork.

Sub-assembly 38 also includes a planet carrier 46. Carrier 46 incorporates an annular element 48 having splines 49 engaged with splines 42 of sleeve 40 and secured thereto by a suitable snap ring 50 or the like. Element 48 also has teeth 51 engageable with teeth 26 of input member 22. Carrier 46 also incorporates a pair of end sections 52 and 54 which support a plurality of shafts 56, one of which is shown in the drawings, spaced in an annular confirguration. Each shaft 56 supports suitable bearings 58 and 60, on which is journalled a planet gear 62. Each planet gear 62 is in mesh with ring gear 36.

Sub-assembly 38 further includes a sun gear 64 rotatably supported on sleeve 40. Sun gear 64 is in mesh with planet gears 62. Suitable thrust washers 66 and 68 space sun gear 64 from element 48 and from a surface 70 of sleeve 40.

In one preferred form of the invention, gears 36, 62 and 64 define helical teeth. Similarly, teeth 16 of reaction plate 14 are helical. As a result, ring gear thrust forces are carried by bearing 18, and the thrust forces of sun gear 64 are balanced by equal and opposite thrust forces set up by helical teeth 16. Thrust forces developed by ring gear 36 in planet gears 62 are balanced by equal and opposite thrust forces developed therein by sun gear 64, giving net carrier thrust forces of zero. Carrier 46 may be contained without thrust bearings, and without imposing a load on the shift fork. Thus, all thrust loads are removed from the rotating members, with the exception of bearing 18.

Figure 2:
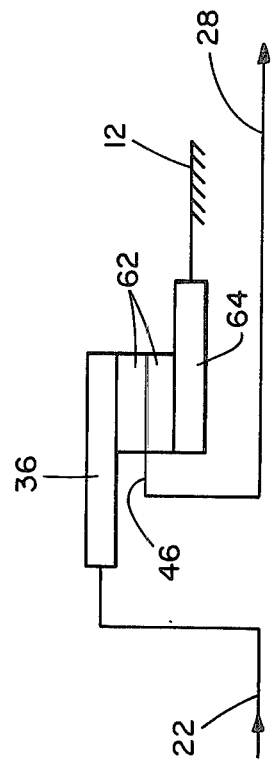
FIG. 2 is a schematic diagram showing the planetary gear assembly in the low-range mode.

As shown in FIGS. 1 and 2, sub-assembly 38 is in the low-range position establishing reduction ratio drive.

Sun gear 64 is engaged with teeth 16 of reaction plate 14, thus effectively grounding sun gear 64 to housing 12. Teeth 51 of element 48 are disengaged from teeth 26 of input member 22.

Torque is transferred from input member 22 directly to ring gear 36. Sun gear 64 acts as a reaction member. Planet gears 62 planetate, and reduction ratio torque is directed from carrier 46 through sleeve 40 to output shaft 28. Reduction ratio drive is established.

Figure 3:
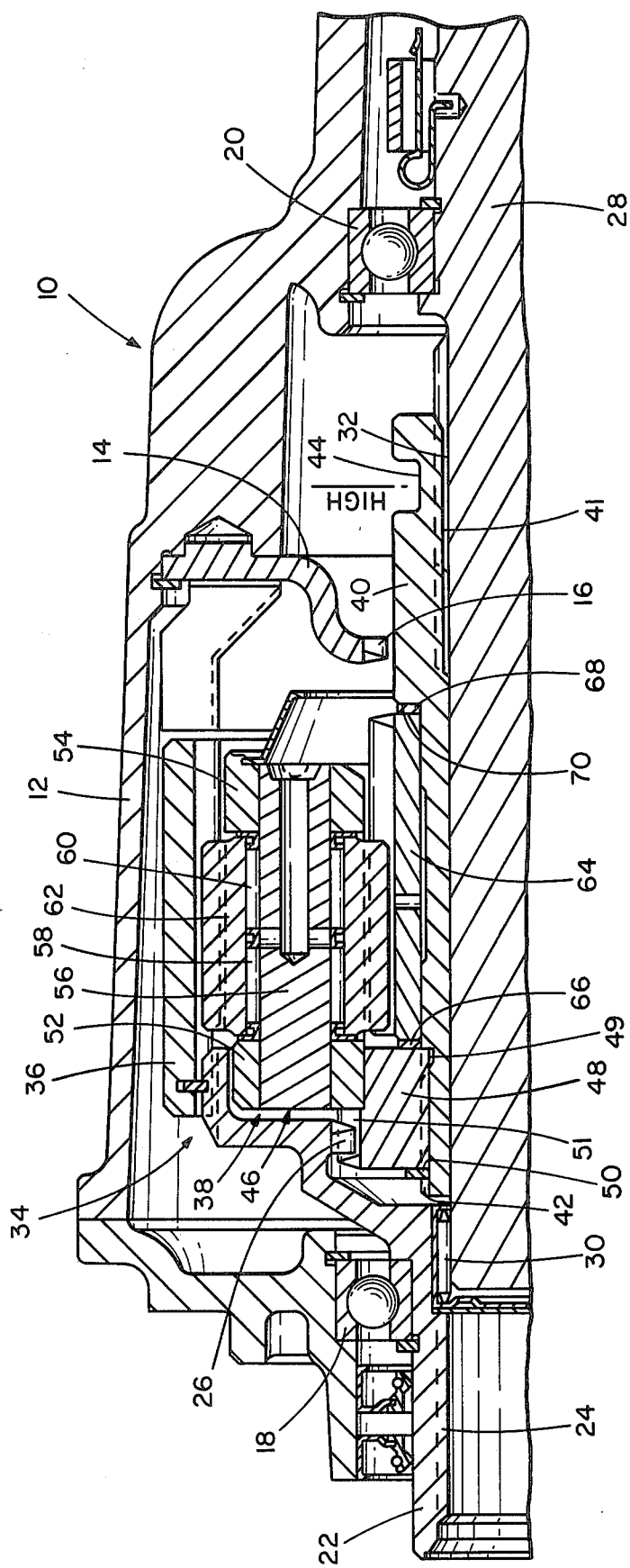
FIG. 3 is a sectional view showing details of the underdrive transmission in the high-range mode establishing direct drive.
Figure 4:
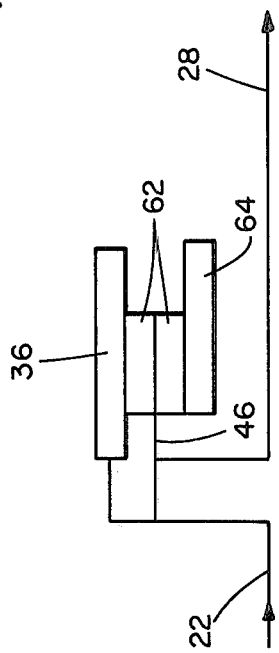
FIG. 4 is a schematic diagram showing the planetary gear assembly in the high-range mode.

As shown in FIGS. 3 and 4, shift sleeve 40, and thus sub-assembly 38, has been shifted to the high-range position establishing direct drive. Sun gear 64 is disengaged from teeth 16 of reaction plate 14. Teeth 51 of element 48 are engaged with teeth 26 of input member 22.

Torque is transferred from input member 22 directly through carrier 46 and sleeve 40 to output shaft 28. Direct drive is established with the gears unloaded. This is of particular advantage, as it is desirable to avoid loading the gears in direct drive, thereby avoiding a condition wherein flats could be worn on the gear teeth should the assembly be run for extended periods.

In one preferred form of the invention, ring gear 36 has 63 teeth, each planet gear 62 has 17 teeth, and sun gear 64 has 29 teeth. As a result, a reduction ratio of 1.46–1.00 is established in the low-range mode. This is considered adequate to provide a moderate reduction ratio for an auxiliary underdrive transmission to be used in automotive vehicle applications.

As disclosed herein, the underdrive transmission is not synchronized. If the capability of shifting on-the-go is desired, suitable synchronizing clutch means may be provided.

The underdrive transmission reduces the number of clutching parts to a minimum. It permits the sun and ring gears to centralize themselves on the planet gear teeth, thus equalizing the loads. It permits ring gear thrust forces to be carried by the input ball bearing, and permits sun gear thrust forces to be taken by equal and opposite thrust forces developed in the reaction plate. Thus, thrust loads are removed from all rotating members other than the input ball bearing.

Spur clutch teeth may be used betwen the input member and the carrier, and straight spline teeth may be used between the carrier and shift sleeve and between the shift sleeve and output shaft.

The mechanism disclosed herein provides an integral unit with its own lubrication system. It is readily adaptable for use with conventional automatic or manual transmissions.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. A transmission comprising a housing, an input member supported for rotation in siad housing, an output shaft supported for rotation in said housing, and a planetary gear assembly in said housing, said planetary gear assembly including a ring gear secured to said input member for rotation therewith, and a sub-assembly, said sub-assembly including a shift sleeve splined to said output shaft for rotation therewith and sliding movement relative thereto, a sun gear rotatably supported by said shift sleeve, a carrier secured to said shift sleeve for rotation and sliding movement therewith, and a plurality of planet gears rotatably supported by said carrier in mesh with said ring and sun gears, said shift sleeve being slidable to a first position in which said sun gear is engaged with said housing and to a second position in which said carrier is engaged with said input member.

2. The invention of claim 1, a bearing supported by said housing, said input member being journalled in said bearing, and said planetary gear assembly and said bearing being constructed and arranged such that all ring gear thrust forces are carried by said bearing when said shift sleeve is in said low-range position.

3. The invention of claim 2, said planetary gear assembly and said housing being constructed and arranged such that all sun gear thrust forces are balanced by equal and opposite thrust forces developed in said housing when said shift sleeve is in said low-range position.

4. The invention of claim 3, said sun gear being rotatably supported between said carrier and a surface of said shift sleeve, a first thrust washer between said carrier and said sun gear, and a second thrust washer between said sun gear and said surface of said shift sleeve, said gears and said housing defining helical teeth, and said sun gear teeth meshing with said housing teeth when said shift sleeve is in said low-range position.

* * * * *

UNITED STATES PATENT AND TRADEMARK OFFICE
CERTIFICATE OF CORRECTION

PATENT NO. : 4,189,960

DATED : February 26, 1980

INVENTOR(S) : JOHN W. HOLDEMAN

It is certified that error appears in the above—identified patent and that said Letters Patent is hereby corrected as shown below:

In the title, change "SUBASSEMBLY" to read -- SUB-ASSEMBLY --.

Column 4, line 11, change "siad" to read -- said --.

Column 1, line 39, change "high" to read -- high- --.
Column 4, line 23, change "first" to read -- low-range --.
Column 4, line 24, change "second" to read -- high-range --.

Signed and Sealed this

Eighth Day of December 1981

[SEAL]

Attest:

GERALD J. MOSSINGHOFF

Attesting Officer  Commissioner of Patents and Trademarks